(12) United States Patent
Liang (10) Patent No.: US 12,239,905 B2
(45) Date of Patent: Mar. 4, 2025

(54) GAME CONTROLLER

(71) Applicant: Shenzhen Mamba Technology Trade Co., Ltd., Shenzhen (CN)

(72) Inventor: Rongfeng Liang, Shenzhen (CN)

(73) Assignee: Shenzhen Mamba Technology Trade Co.,Ltd., Shenzhen (CN)

( * ) Notice: Subject to any disclaimer, the term of this patent is extended or adjusted under 35 U.S.C. 154(b) by 0 days.

(21) Appl. No.: 18/791,811

(22) Filed: Aug. 1, 2024

(65) Prior Publication Data

US 2024/0390783 A1 Nov. 28, 2024

(30) Foreign Application Priority Data

Oct. 10, 2023 (CN) .......................... 202322720499.0

(51) Int. Cl.
*A63F 13/24* (2014.01)
(52) U.S. Cl.
CPC .................................. *A63F 13/24* (2014.09)

(58) Field of Classification Search
CPC ....................................................... A63F 13/24
See application file for complete search history.

(56) References Cited

U.S. PATENT DOCUMENTS

| | | | |
|---|---|---|---|
| 2004/0229695 A1* | 11/2004 | Hussaini ................ | A63F 13/24 463/38 |
| 2015/0105152 A1* | 4/2015 | Bellinghausen .... | A63F 13/2145 463/31 |

* cited by examiner

*Primary Examiner* — Peter J Iannuzzi
(74) *Attorney, Agent, or Firm* — Westbridge IP LLC (57) ABSTRACT

A game controller includes a body, a display screen assembly arranged on the body, and a gripping part arranged on the body. The display screen assembly includes a display screen and a bracket for mounting the display screen, and the display screen assembly detachably mounts the display screen on the body through the bracket. The display screen of the application is arranged on the bracket that is detachably mounted with the body, which is convenient to disassemble, repair, and replace through the bracket. At the same time, during transportation, it can be removed from the controller and the display screen assembly can be packaged separately to reduce damage during transportation.

5 Claims, 7 Drawing Sheets

GAME CONTROLLER

CROSS-REFERENCE TO RELATED APPLICATIONS

This application claims priority to Chinese Patent Application No. 202322720499.0, filed on Oct. 10, 2023, the content of which is incorporated herein by reference in its entirety.

TECHNICAL FIELD

The present application relates to the technical field of game machines, in particular to a game controller.

BACKGROUND

Game controller is a common component of electronic game machines, which can control simulated characters on electronic devices such as mobile phones and computers by manipulating its buttons, so as to achieve the purpose of playing games. The main structural components of a game controller include controller housing, arrow keys, arrow key fixing bracket, a plurality of elastic trigger buttons (silicone buttons or dome buttons) and a trigger circuit board (PCB board), wherein the center of the arrow key is mounted on the arrow key fixing bracket, the trigger button is arranged in the arrow key fixing bracket, and the trigger circuit board is arranged in the controller housing and is positioned below the arrow key fixing bracket. By manipulating the arrow key, it presses a certain trigger button, and the trigger button compresses and moves in the direction of the trigger circuit board and then touches the trigger circuit board to trigger the corresponding function.

At present, most game controllers on the market do not have the display screen function. Some specific game controllers have a built-in small display screen in the middle and upper part to display some specific game information, such as game time, remaining life, etc., which is inconvenient to disassemble, repair and replace.

SUMMARY

In view of this, it is necessary to provide a game controller with a cover plate for display screen.

The game controller includes a game controller body, a display screen assembly arranged on the body, and a gripping part arranged on one side of the body, wherein the display screen assembly includes a display screen and a bracket for mounting the display screen, and the display screen assembly detachably mounts the display screen on the other side of the body away from the gripping part through the bracket.

As a preferred embodiment, a mounting groove is provided on one side of the body, and the display screen assembly is assembled on the body through the mounting groove.

As a preferred embodiment, the body comprises a front surface, and an opening of the mounting groove is opened from the front surface to a side surface of the body, when the display screen assembly is mounted on the body, the display screen is arranged parallel to the front surface, and the bracket is mated and fixed with the body.

As a preferred embodiment, the bracket comprises a cover plate, a side plate, and a mating part, and the side plate is arranged correspondingly to the side surface of the body; the cover plate comprises a top surface and a back surface that are opposite to each other; the display screen is mounted on the back surface of the cover plate and covered by the cover plate; the mating part is arranged at the back surface of the cover plate at intervals so as to be mated and fixed with the body, and the picture displayed by the display screen is displayed through the cover plate.

As a preferred embodiment, the bracket is made of a transparent black material.

As a preferred embodiment, the bracket comprises the cover plate, the side plate, and the mating part, and the side plate is disposed correspondingly to the side surface of the body; the cover plate comprises a frame body with an opening and a top cover arranged in the frame body, the display screen is mounted on the frame body and positioned under the top cover, and the mating part is arranged on the back surface of the cover plate at intervals to be mated and fixed with the body.

As a preferred embodiment, the frame body comprises an outer frame and a bottom frame extending from a bottom of the outer frame, the display screen is supported by the bottom frame, and the top cover covers the display screen and is surrounded by the outer frame.

As a preferred embodiment, the top cover is made of a glass material.

As a preferred embodiment, the body comprises a housing and a panel, the panel is detachably mounted on the housing, and the panel is parallel to the display screen.

As a preferred embodiment, the panel is suction-connected to the housing so that the panel is detachably mounted on the housing.

The display screen of the application is arranged on the bracket that is detachably mounted with the body, which is convenient to disassemble, repair, and replace through the bracket. At the same time, during transportation, it can be removed from the controller and the display screen assembly can be packaged separately to reduce damage during transportation.

In order to explain the structural features and efficacy of the present application more clearly, the present application will be described in detail below with reference to the drawings and specific embodiments.

DETAILED DESCRIPTION OF THE EMBODIMENTS

In order to make the objects, technical solutions, and advantages of the present application clearer, the present application is described in detailed below with reference to the drawings and embodiments. It is to be understood that the specific embodiments described herein are merely for illustration of the present application, and are not intended to limit the present application.

It should be noted that when an element is referred to as "fixed" to another element, it may be directly on the other element or a centered element may be present. When an element is considered to be "connected" to another element, it may be directly connected to the other element or a centered element may be present at the same time. The terms "vertical", "horizontal", "left", "right" and similar expressions used herein are for illustrative purposes only.

Figure 1:
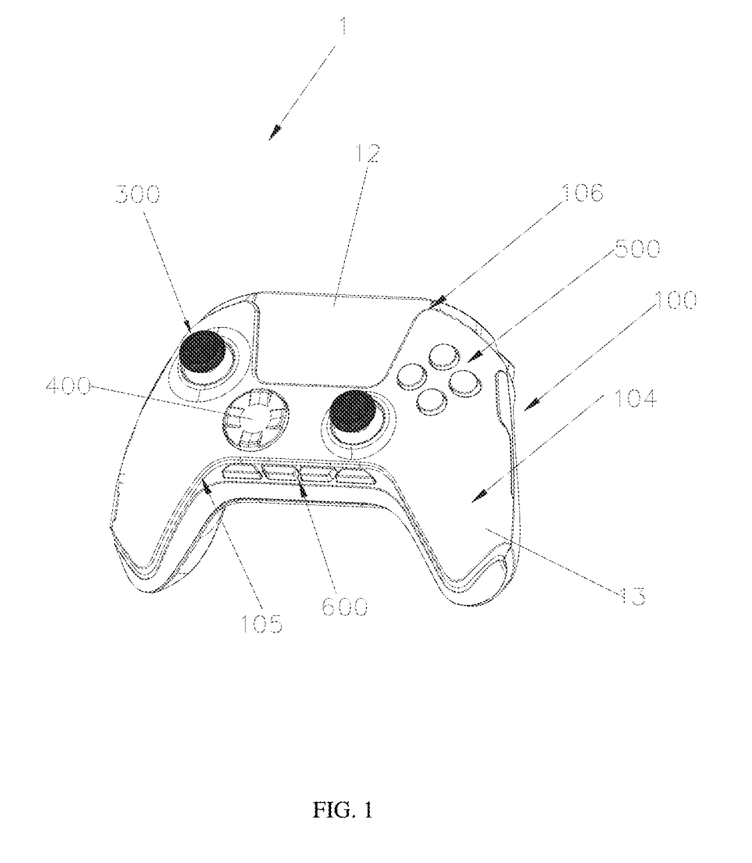
FIG. 1 is a three-dimensional schematic view of a game controller according to an embodiment of the present application.
Figure 2:
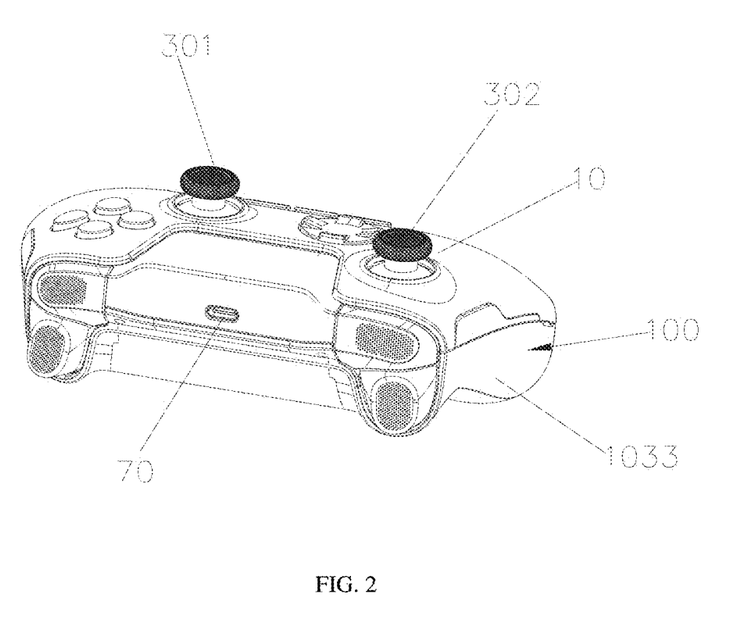
FIG. 2 is a three-dimensional schematic view of another angle of the game controller according to an embodiment of the present application.
Figure 3:
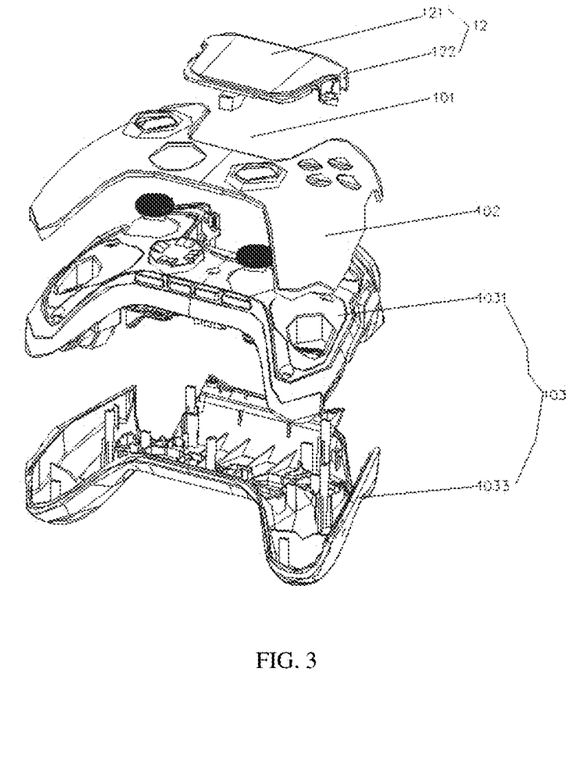
FIG. 3 is an exploded schematic view of the game controller shown in FIG. 1.

Refer to FIGS. 1 to 3, which provide schematic diagrams of a game controller 1 according to the first embodiment of the present application. The game controller 1 includes a body 100, a display screen assembly 12 arranged on the body 100, and a gripping part 13. Body 100. The display screen assembly 12 is detachably mounted on the body 100. In the embodiment, the gripping part 13 is positioned on one side of the game controller 1, and the display screen assembly 12 is mounted on the other side of the body 100 from the side away from the gripping part 13. When a user manipulates the game controller 1, the game controller 1 is gripped by the user. In some other embodiments, the display screen assembly 12 may be mounted on the body 100 from either side of the game controller 1.

The body 100 is provided with a mounting groove 101 for mounting the display screen assembly 12. The body 100 includes a housing 103, and a panel 102 detachably covered with the housing 101. The panel 102 covers one surface of the housing 103 to form the front surface 104 of the body 100. The housing 103 is provided with a button 400, joysticks 300, a wiring board (not shown), a processor, a battery, etc., so that the components of the game controller 1 are assembled together, and the function of the game controller is realized. In the embodiment, the housing 103 and the panel 102 are assembled together by magnetic attraction.

The housing 103 includes an upper shell 1031 and a lower shell 1033 that are detachably assembled together, and the housing 103 is a structural frame of the game controller, which ensures the stability and durability of the controller, and can not only protect internal circuits and assemblies, but also prevent the controller from external impact and damage. The setting of panel 102 provides a place for the game controller 1 to place the control buttons and control units. The buttons and control units may be arranged in the appropriate position. At the same time, it is also convenient for assembly and maintenance, and the detachable setting of the panel 102 makes the assembly and maintenance of the controller more convenient. When cleaning, component replacement, or repair is required, the panel 102 and the housing 103 can be easily removed to replace or repair assemblies such as internal circuits and connecting wires.

The gripping part 13 includes a symmetrical left gripping part (not shown) and a right gripping part (not shown). The left gripping part (not shown) and the right gripping part 1 (not shown) extend at intervals from one side 105 (rear end) of the housing 103, so that a recessed part (not shown) is formed at a position between the left gripping part and the right gripping part at the rear end 105, and the recessed part is opposed to the mounting groove 101. The mounting groove 101 is opened from the front surface 104 of the body 100 to the other side 106 (i.e. front end) away from the gripping part 13. The housing 103 is also provided with a plurality of mounting parts (not shown) at the position of the mounting groove 101. Understandably, the position of the mounting groove 103 may change as the relative position of the display screen assembly 12 with respect to the body 100 changes according to actual setting needs. For example, when the display screen assembly 12 needs to be assembled from the left side of the body 100, the position of the mounting groove 103 is positioned on the left side of body 100; when the display screen assembly 12 needs to be assembled from the right side of the body 100, the position of the mounting groove 103 is positioned on the right side of the body 100.

Referring in conjunction with FIGS. 4 and 5, FIGS. 2 and 3 are schematic views of the display screen assembly 12 of the first embodiment from two viewing angles, respectively, from the front and the back. The display screen assembly 12 is mounted on the body 100 through the mounting groove 101. Specifically, in the embodiment, the display screen assembly 12 includes a display screen 121 and a bracket 122. The display screen assembly 12 mounts the display screen 121 detachably on the body 100 through the bracket 122. Further, when the display screen assembly 12 is mounted on the body 100, the display screen 12 is arranged parallel to the front surface 104, and the bracket 122 is mated and fixed with the body 100. In the embodiment, the display screen 12 deviates from the middle position of the front surface 104 and is located on one side. In some other feasible embodiments, the display screen 12 is arranged in the middle position of the front surface according to the actual situation, that is, the above embodiment is only an example of the position of the display screen 12.

Figure 4:
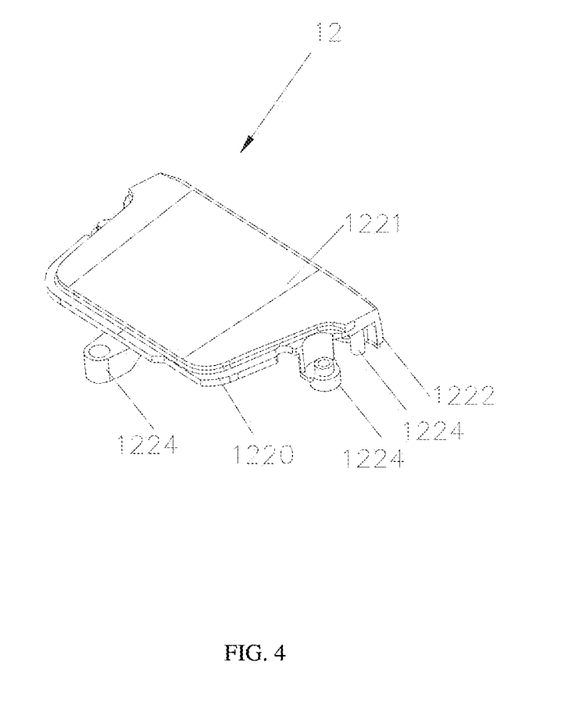
FIG. 4 is a three-dimensional schematic view of a display screen assembly of the game controller according to the first embodiment of the present application.
Figure 5:
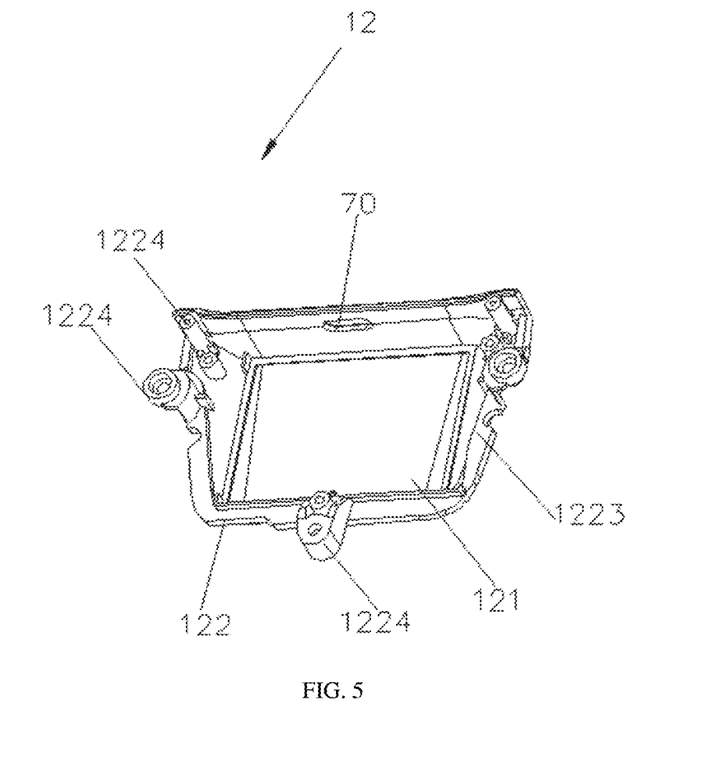
FIG. 5 is a three-dimensional schematic view of another angle of the display screen assembly of the game controller shown in FIG. 4.

The bracket 122 includes a cover plate 1220, a side plate 1222, and a mating part 1224. The side plate 1222 extends downward from one end of the cover plate 1220. The side plate 1222 is arranged opposite to the gripping part 13. The cover plate 1220 includes a top surface 1221 and a back surface 1223 that are arranged opposite to each other. The display screen 121 is fixed on the back surface 1223, and is covered by the cover plate 1220 and is closely integrated with the cover plate 1220. The picture displayed by the display screen 121 is displayed through the cover plate 1220. The displayed picture includes information for game status, menu options, character information, and the like. The side plate 1222 is also provided with a connector 70 through which the game controller 1 can be charged or communicated with the game console. When the display screen assembly 12 is mounted on the housing 103, the cover plate 1220 and the side plate 1222 cover the mounting groove 101 so that the housing 103 forms a complete housing. Understandably, the side plate 1222 is arranged corresponding to one side of the body 100 according to the position of the display screen assembly 12. For example, in the embodiment, the display screen assembly 12 is assembled on the front end side of the body 100, and the side plate 1222 is provided corresponding to the front end of the body 100, that is, is provided opposite to the gripping part 13. If the display screen assembly 12 is assembled on the left side of the body 100, the side plate 1222 is arranged corresponding to the left side of the body 100. That is, it is merely an example that the side plate 1222 is arranged opposite to the gripping part 13.

The display screen 121 is a touch-functional display screen or a touch screen with a touch function. The size of the display screen 121 may be set according to actual conditions, such as 2.8 inches, 3.2 inches, and so on. There is no limit here. The size of the cover plate 1220 is larger than that of the display screen 121, and the display screen 121 is arranged in the middle position of the cover plate 1220, so that additional protection and durability of the screen can be enhanced. The edge of the cover plate 1220 usually covers the frame body of the display screen 121, so that the display screen 121 can be protected from collision and damage. The cover plate 1220 may be used to enhance the durability of the screen, prevent scratches, fingerprints, and other conditions that may cause damage to the screen in daily use. At the same time, the display screen 121 is in an area susceptible to impact and shock on the game controller, and the larger cover plate 1220 can provide better impact and shock resistance, reduce the risk of damage of the display screen 121 in movement or accidents, thereby prolonging its service life.

In the embodiment, the bracket 122 is all made of a material having a certain transparency, such as a transparent black material or a transparent plastic material. The transparent black material has a certain degree of transparency, can pass through a certain degree of light, and has a black appearance. The transparent black materials include fully transparent black material and translucent black material, for example, transparent black plastic material, transparent black glass material.

In some feasible embodiments, only the cover plate 1220 of the bracket 122 is made of light-transmitting material or a partial area of the cover plate 1220 is made of light-transmitting material, such as an area opposite the display screen 121, so as to ensure that the picture displayed by the display screen 121 can be viewed.

The mating part 1224 is provided at intervals from the back surface 1223 and assembled with the mounting part, so as to preposition the bracket 122 with a display screen 121, and fix the bracket 122 on the housing 103 through a fixing element (not shown). The fixing elements are bolts, screws, etc.

Figure 6:
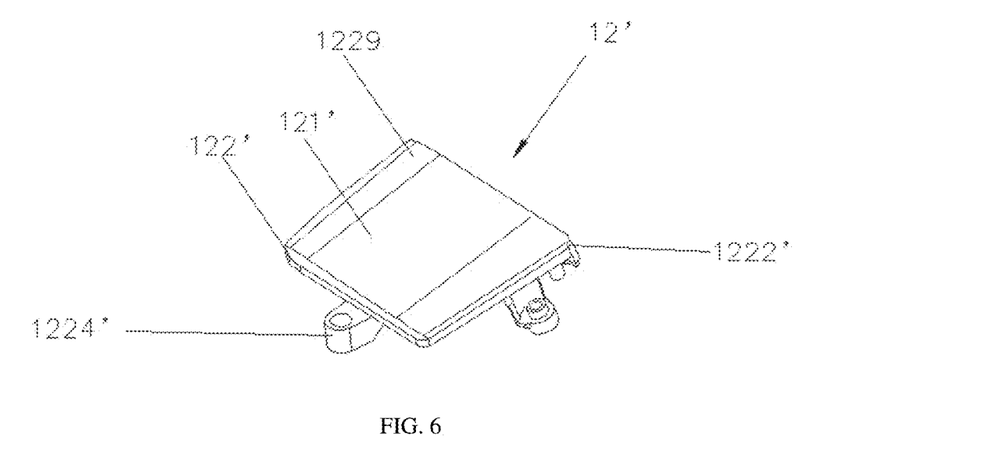
FIG. 6 is a three-dimensional schematic view of a display screen assembly of a game controller according to the second embodiment of the present application.
Figure 7:
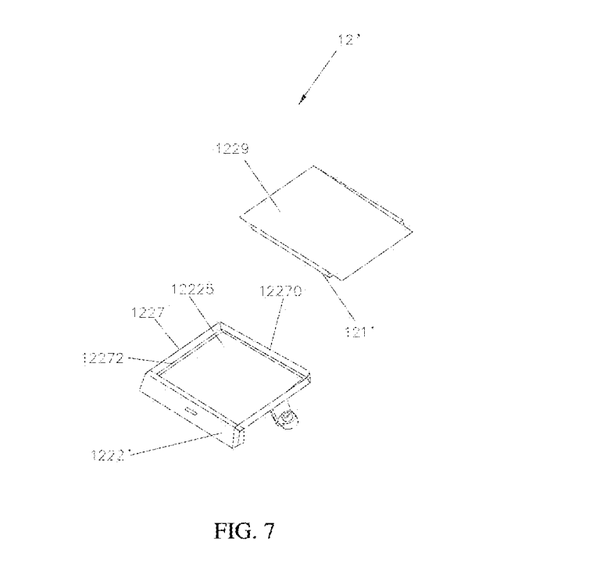
FIG. 7 is an exploded schematic view of the display screen assembly of the game controller shown in FIG. 6.

Refer in conjunction with FIGS. 6 and 7, which are an overall schematic view and an exploded view, respectively, of the display screen assembly 12' of the second embodiment.

In the embodiment, the display screen assembly 12' also includes the display screen 121' and the bracket 122', but the bracket 122' of the display screen assembly 12' is different from the bracket 122 of the first embodiment in structure, and the assembly structure of the display screen 121' and the bracket 122' is also different from the assembly structure of the display screen 121 and the bracket 1222 of the first embodiment.

The bracket 122' includes a cover plate 1220', a side plate 1222', and a mating part 1224'. The side plate 1222' extends vertically from one end of the cover plate 1220'. The side plate 1222' is arranged opposite to the gripping part 13. The cover plate 1220' includes a frame body 1227 with an opening 12225 and a top cover 1229. The frame body 1227 includes an outer frame 12270 and a bottom frame 12272 extending from the bottom of the outer frame 1227. The display screen 121' is supported by the bottom frame 12272, and the top cover 1229 covers the display screen 121' and is surrounded by the outer frame 1227. The top cover 1229 is made of a transparent black material. In the embodiment, the top cover 1229 is made of a glass material, that is, a glass panel. Further, the glass panel is a transparent black glass panel or a translucent black glass panel. The display screen 121' is bonded to the top cover 1229 by an adhesive. In the embodiment, the display screen 121' is a touch screen with a touch function.

In the above embodiments, the display screen is arranged on the bracket that is detachably mounted with the body, which is convenient to disassemble, repair, and replace through the bracket. At the same time, during transportation, it can be removed from the controller and the display screen assembly can be packaged separately to reduce damage during transportation.

In addition, the display screen assembly 12 is provided at the position of the game controller 1 away from the rear side edge of the gripping part 13, which can provide the user with a better gaming experience and operation convenience. By placing the display screen assembly 12 in this position, the user can view important information in the game more conveniently, such as character attributes, maps, tasks, etc. At the same time, this position is close to the user's finger, which can help the user make corresponding operations more quickly and improve the real-time performance of the game. In addition, the placement of the display screen assembly 12 at the side edge position can also reduce the occlusion of the finger touch area, making the operation smoother. This allows the user to enjoy the game better without interfering the operation in game.

Refer to FIGS. 3 and 8 again, the upper shell 1031 is provided with a joystick 300, the joystick 300 includes a joystick base and a joystick column, the joystick base is embedded in the upper shell 1031 and is fixed on the lower shell 1033, the joystick column and the joystick base are detachably connected, the joystick column is exposed on the upper shell 1031, the joystick 300 further includes a joystick head, and the joystick head is detachably connected to the top of the joystick column.

Figure 8:
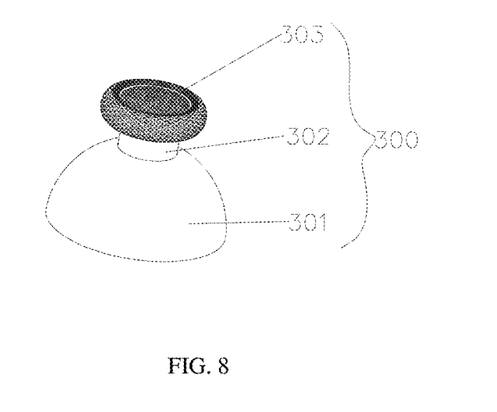
FIG. 8 is a three-dimensional schematic view of a joystick of the game controller shown in FIG. 7.

The joystick column is a core component of the joystick 300 and can detect finger movements and changes in direction. The joystick head is located at the top of the joystick column and is the area where the fingers are placed, usually a round or thumb-shaped button. The joystick base is the portion where the joystick column is inserted, holding the joystick 300 and providing stable support. The joystick 300 also includes a spring and a sensor, wherein the spring is located in the joystick base for adjusting the force of the joystick 300 to return to the center position, and the sensor is used to detect the force exerted by the finger on the joystick head.

The joystick head and the joystick column of the joystick 300 can be disassembled and replaced to facilitate maintenance and replacement, by disassembling and replacing the joystick head and the joystick column, the user can easily repair or replace worn or damaged parts. This can prolong the life of the controller and keep it in good operating performance.

At the same time, the disassembly and replacement of the joystick head and joystick column allows users to make personalized customization according to their own preferences and needs. They can choose joystick heads and joystick columns of different shapes, materials, specific sizes and friction to get an experience that is more in line with their feel and operating style. In this way, the replaceability of the joystick head and joystick column makes the game controller more versatile. For example, in different types of games, different joystick heads and joystick columns may be needed to provide more precise control, for example, a more sensitive joystick 300 is needed in a shooting game, a larger joystick head is needed in a racing game, etc. Users can make changes as needed to suit different gaming experiences.

Further, refer to FIGS. 1 to 3, the joystick 300 includes a first joystick 301 and a second joystick 302, the first joystick 301 is close to the left side of the display screen, the second joystick 302 is arranged on the front side of the display screen, and the connecting line between the first joystick 301 and the second joystick 302 is a diagonal line on the front.

This arrangement is due to the operational inertia of the user, and most users are accustomed to placing the main operating joystick 300 on the left-hand side, because the left hand is more flexible when controlling the game. Therefore, the first joystick 301 is usually arranged on the upper left side of the display screen 121 to provide the most intuitive and natural operating experience. In most games, the first joystick 301 is usually used for controlling important operations such as movement of a character and rotation of a viewing angle, while the second joystick 302 is used for auxiliary operations such as controlling a camera or performing special actions. Placing them in different areas of the display screen 121 makes the function and role operation of the two joysticks 300 more clear and avoids misoperation. The two joysticks do not interfere with each other, making it easier for the user to perform minor operations.

Refer to FIG. 1 again, the upper shell 1031 is further provided with the arrow keys 400 and a button set 500, the arrow keys 400 and the second joystick 302 are arranged side by side on the same side of the display screen 121; the button set 500 and the first joystick 301 are symmetrically arranged on both sides of the display screen 121 opposite to each other. The upper shell 1031 is further provided with a menu key 600, and the menu key 600 is arranged on the rear side of the arrow keys 400 and the second joystick 302.

In the embodiment, the arrow keys 400 and the button set 500 are used in combination to generate different key values corresponding to different functions. The arrow keys 400 are used to control the direction of the character or select menu options in the game, including up, down, left, and right directions. The button set 500 is used for various operations and interactions in the game. In the embodiment, the button set 500 has four buttons, the button set 500 is distributed in a cross shape, and the button set 500 is arranged into four buttons A, B, X, and Y in the game controller.

The menu key 600 of the game controller 1 is used to open the main game menu or navigation interface, so that the user can browse game options, settings, configurations of control units, etc. The game controller includes a pause/continue key, which is usually used in games to pause the game, allowing the user to pause the game progress or continue the game; further, a return key, which is used to return to the previous menu or close the current menu; and a multimedia control button, which is used to control multimedia functions, such as music playback, video pause, etc.

The above description is merely preferred embodiments of the present application, and is not intended to limit the present application. Any modifications, equivalent substitutions and improvements made within the principles of the present application shall be covered within the scope of protection of the present application.

What is claimed is:

1. A game controller, comprising a body, a display screen assembly arranged on the body, and a gripping part arranged on the body, wherein the display screen assembly comprises a display screen and a bracket for mounting the display screen, and the display screen assembly detachably mounts the display screen on the body through the bracket; wherein the body is provided with a mounting groove, and the display screen assembly is assembled on the body through the mounting groove;

the body comprises a front surface, and an opening of the mounting groove is opened from the front surface to a side surface of the body, when the display screen assembly is mounted on the body, the display screen is arranged parallel to the front surface, and the bracket is mated and fixed with the body; and the bracket comprises a cover plate, a side plate, and a mating part, and the side plate is arranged correspondingly to the side surface of the body; the cover plate comprises a top surface and a back surface that are opposite to each other; the display screen is mounted on the back surface of the cover plate and covered by the cover plate; the mating part is arranged at the back surface of the cover plate at intervals so as to be mated and fixed with the body, and a picture displayed on the display screen is displayed through the cover plate.

2. The game controller according to claim 1, wherein the bracket is made of a transparent black material.

3. The game controller according to claim 1, wherein the body comprises a housing and a panel, the panel is detachably mounted on the housing, and the panel is parallel to the display screen.

4. The game controller according to claim 3, wherein the panel is suction-connected to the housing so that the panel is detachably mounted on the housing.

5. A game controller, comprising a body, a display screen assembly arranged on the body, and a gripping part arranged on the body, wherein the display screen assembly comprises a display screen and a bracket for mounting the display screen, and the display screen assembly detachably mounts the display screen on the body through the bracket; wherein the body comprises a housing and a panel, the panel is detachably mounted on the housing, and the panel is parallel to the display screen; and the panel is suction-connected to the housing so that the panel is detachably mounted on the housing.

* * * * *